(12) United States Patent
Kuragaki et al.

(10) Patent No.: US 7,136,736 B2
(45) Date of Patent: Nov. 14, 2006

(54) VEHICULAR TRAVEL CONTROL DEVICE

(75) Inventors: Satoru Kuragaki, Hitachi (JP); Tokuji Yoshikawa, Hitachi (JP); Shiho Izumi, Hitachi (JP); Hiroshi Kuroda, Hitachi (JP); Takao Kojima, Hitachi (JP); Toshimichi Minowa, Mito (JP); Toshio Manaka, Hitachinaka (JP); Nobuyuki Ueki, Sagamihara (JP); Kazuaki Takano, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/419,878

(22) Filed: Apr. 22, 2003

(65) Prior Publication Data

US 2004/0138802 A1   Jul. 15, 2004

(30) Foreign Application Priority Data

Jan. 10, 2003   (JP) .............................. 2003-003834

(51) Int. Cl.
   *G01S 3/00*   (2006.01)
   *G01S 13/36*   (2006.01)

(52) U.S. Cl. ........................... 701/70; 701/28; 342/104

(58) Field of Classification Search .................. 701/70, 701/71, 28; 342/109, 104, 105, 118, 127, 342/128, 134, 129, 200, 201, 202, 82, 89, 342/70, 117, 106, 71
   See application file for complete search history.

(56) References Cited

U.S. PATENT DOCUMENTS

| 3,859,660 | A | * | 1/1975 | Augustine et al. ........... 342/114 |
| 3,910,647 | A | | 10/1975 | Takeuchi ................... 303/21 A |
| 4,148,028 | A | | 4/1979 | Fujiki ..................... 343/7 VM |
| 4,414,548 | A | * | 11/1983 | Carpenter et al. ........... 342/117 |
| 5,371,718 | A | * | 12/1994 | Ikeda et al. .................... 367/91 |
| 6,121,915 | A | * | 9/2000 | Cooper et al. ................. 342/70 |
| 6,147,638 | A | * | 11/2000 | Rohling et al. .............. 342/109 |
| 6,223,118 | B1 | * | 4/2001 | Kobayashi et al. ............ 701/96 |
| RE37,725 | E | * | 6/2002 | Yamada ........................ 342/72 |
| 6,445,337 | B1 | | 9/2002 | Reiche ......................... 342/104 |
| 6,681,180 | B1 | * | 1/2004 | Bevly et al. ................. 701/213 |

FOREIGN PATENT DOCUMENTS

| DE | 38 25 639 A | 2/1990 |
| DE | 100 50 278 A | 4/2002 |
| JP | 2001-047832 | 2/2001 |

* cited by examiner

*Primary Examiner*—Dalena Tran
(74) *Attorney, Agent, or Firm*—Crowell & Moring LLP (57) ABSTRACT

In a vehicular control device, it is necessary to measure or calculate six physical quantities-forward-reverse speed, left-right speed, vertical speed, pitch angle, roll angle, and angle of sideslip-representing vehicular movement and to control the braking force of each wheel and/or the damping coefficient of each suspension shock absorber in order to further shorten braking distance particularly at the time of braking and to prevent spin at that time. In this case, it is necessary to furnish sensors to measure speed and angle directly. In the present invention, four radar sensors are used in order to directly measure the forward-reverse speed and the left-right speed. Also, the vertical speed, the pitch angle, the roll angle, and the angle of sideslip are indirectly measured from the output of the radar sensors. By using three or four radar sensors, six physical quantities—the forward speed, the left-right direction speed, the vertical speed, the angle of sideslip, the pitch angle, and the roll angle—can be measured. Also, by using two radar sensors, three physical quantities—the forward speed, the left-right speed, and the angle of sideslip—can be measured.

12 Claims, 10 Drawing Sheets

FIG. 11

VEHICULAR TRAVEL CONTROL DEVICE

BACKGROUND OF THE INVENTION

1. Field of the Invention

The present invention relates to a vehicular travel control device using radar sensors.

2. Description of Related Art

An electric control device that is equipped with six different kinds of sensors—speed sensors, forward-reverse acceleration sensor, left-right acceleration sensor, vertical acceleration sensor, clearance sensor, and yaw rate sensor—for a total of sixteen sensors, calculates six physical quantities-forward-reverse speed, left-right speed, vertical speed, pitch angle, roll angle, and yaw angle—representing vehicular movement, and conducts control of shock absorbers is disclosed in JP-A-2001-47832.

In a vehicular control device, it is necessary to measure or calculate six physical quantities—forward-reverse speed, left-right speed, vertical speed, pitch angle, roll angle, and angle of sideslip—representing vehicular movement and to control the braking force of each wheel and/or the damping coefficient of each suspension shock absorber in order to further shorten braking distance particularly at the time of braking and to prevent spin at that time. However, there has been the problem that, in the prior art, speed and angle must be directly measured using many different kinds of sensors in order to obtain these physical quantities, and the burdens of cost, maintenance, adjustment, and control have been great.

SUMMARY OF THE INVENTION

In order to solve the above-described problem, the present invention is characterized in that forward-reverse speed, left-right speed, and vertical distance from a road surface are directly measured by radar sensors, and is further characterized in that vertical speed, pitch angle, roll angle, and angle of sideslip are indirectly measured or calculated from outputs of the radar sensors.

DESCRIPTION OF PREFERRED EMBODIMENTS

In the present invention, radar sensors are used to directly measure forward-reverse speed, left-right speed, and vertical distance from a road surface. Also, vertical speed, pitch angle, roll angle, and angle of sideslip are indirectly measured from outputs of the radar sensors.

In the present invention, there are disposed plural radar sensors and an electronic control unit containing a computer, with a Doppler shift frequency superposed on a reflection signal of a signal emitted toward a road surface from the radar sensors being detected by each radar sensor, and the forward-reverse speed and the left-right speed being calculated and communicated to the electronic control unit. The vertical speed, pitch angle, roll angle, and angle of sideslip, which are physical quantities of vehicular movement, are calculated on the basis of the detection result (speed, etc.) received at the electronic control unit.

The radar sensors of the present invention may include an emission section having a function of emitting a signal whose frequency can be changed, a reflection signal receiving section having a reflection signal receiving function, a phase difference detection section having a phase difference detecting function, a Doppler shift frequency detection section having a Doppler shift frequency detecting function, and an output pulse signal modulation section having an output pulse signal modulating function. The radar sensors or a peripheral section including the radar sensors, the phase difference detection section, the Doppler frequency detection section, and the modulation section detect, with the phase difference detection section, the phase difference of each reflection signal of two signals whose frequencies are different and that are emitted from the emission section toward a road surface, and vary one of a frequency or on-duty ratio of the output pulse signal by the output pulse signal modulation section.

In the present invention, there are included plural radar sensors, a steering angle sensor, a brake unit that varies braking force of each wheel, and an electronic control unit containing a computer, with a Doppler shift frequency superposed on a reflection signal of a signal emitted toward a road surface being detected by each radar sensor and the braking force of each wheel being varied on the basis of the detection result. The detection result detected by the sensors includes the function of being transmitted to the electronic control unit.

Also, as for the detection result, a measured angle of sideslip and a forward-reverse speed (ground speed) are calculated in the electronic control unit on the basis of the detection result. Moreover, the braking force of each wheel is varied so that the measured angle of sideslip follows a target angle of sideslip set from the steering angle and the ground speed.

Moreover, there are included wheel speed sensors disposed in correspondence to each wheel, with the Doppler shift frequency superposed on the reflection signal of the emission signal emitted toward the road surface being detected by each radar sensor, and the braking force of each wheel being varied in the electronic control unit so that each wheel speed sensor measured value follows each target wheel speed set on the basis of the Doppler shift frequency.

Moreover, there are included damping coefficient varying shock absorbers corresponding to each wheel, with the phase difference between the reflection signal and the signal emitted toward the road surface and the Doppler shift frequency superposed on the reflection signal being detected by each radar sensor. The damping coefficient of each shock absorber or the braking force of each wheel is varied on the basis of the phase difference and the Doppler shift frequency.

Of the plural radar sensors and the electronic control unit containing the computer, at least one of the radar sensors and the electronic control unit are connected via at least two electrical wires (twist pair) and communicate with a pulse signal.

The present invention is also a vehicle equipped with the vehicular travel control device.

Figure 1:
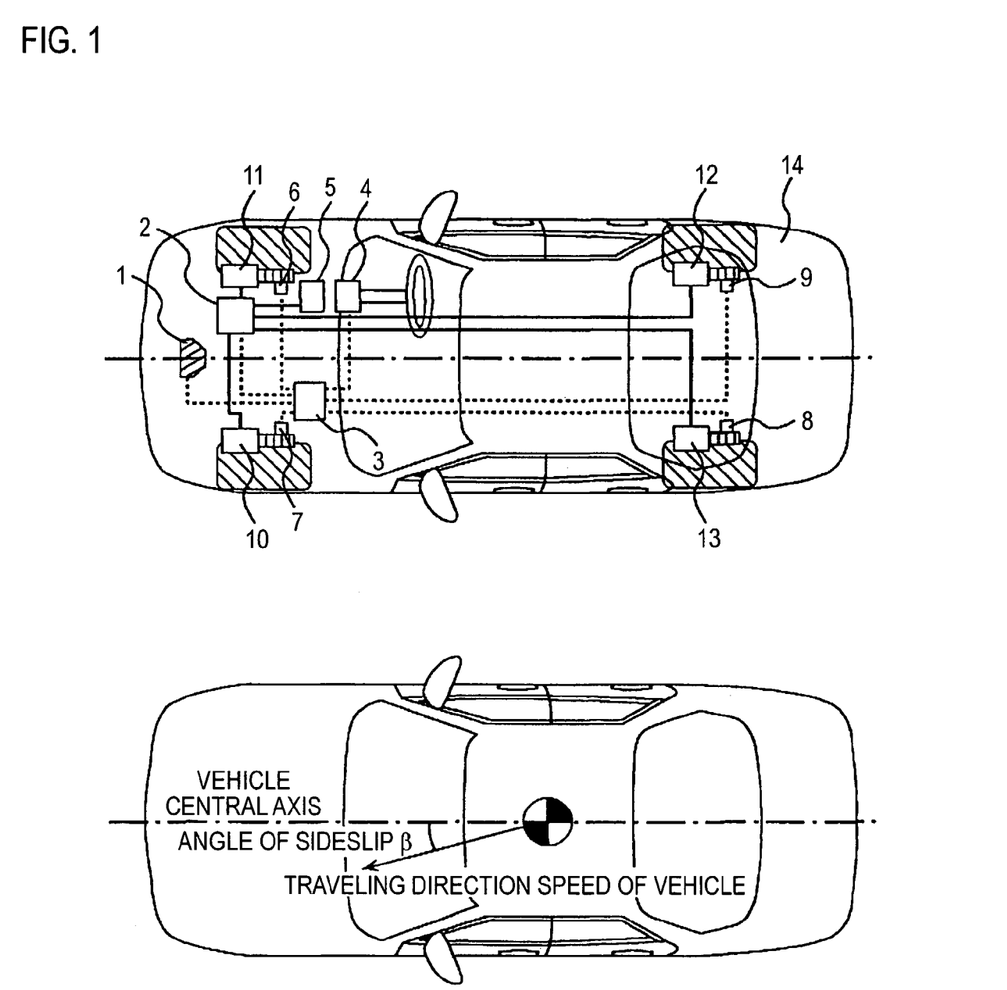
FIG. 1 illustrates a vehicle of a first embodiment equipped with a vehicular travel control device.

FIG. 1 illustrates, as a first embodiment, a vehicle equipped with a braking control device of the present invention. Installed in a vehicle 14 are: a ground speed sensor 1, which is a radar sensor or the like that detects relative speed with respect to a road surface; a brake unit 2 that controls braking force of each wheel, and which here is a hydraulic brake unit that controls pressure applied to hydraulic brake calipers; an electronic control unit 3 that conducts calculation processing on the basis of a signal from the sensor and controls, on the basis of the calculation result, an actuator and an actuator such as a brake unit and shock absorbers that can vary a damping coefficient; a steering angle sensor 4 that detects a steering angle; a stroke sensor 5 that detects, as a stroke, a depression amount of an accelerator pedal; wheel speed sensors 6, 7, 8 and 9 that detect wheel speeds of wheels; and brake calipers 10, 11, 12 and 13 that control the braking force.

Figure 2:
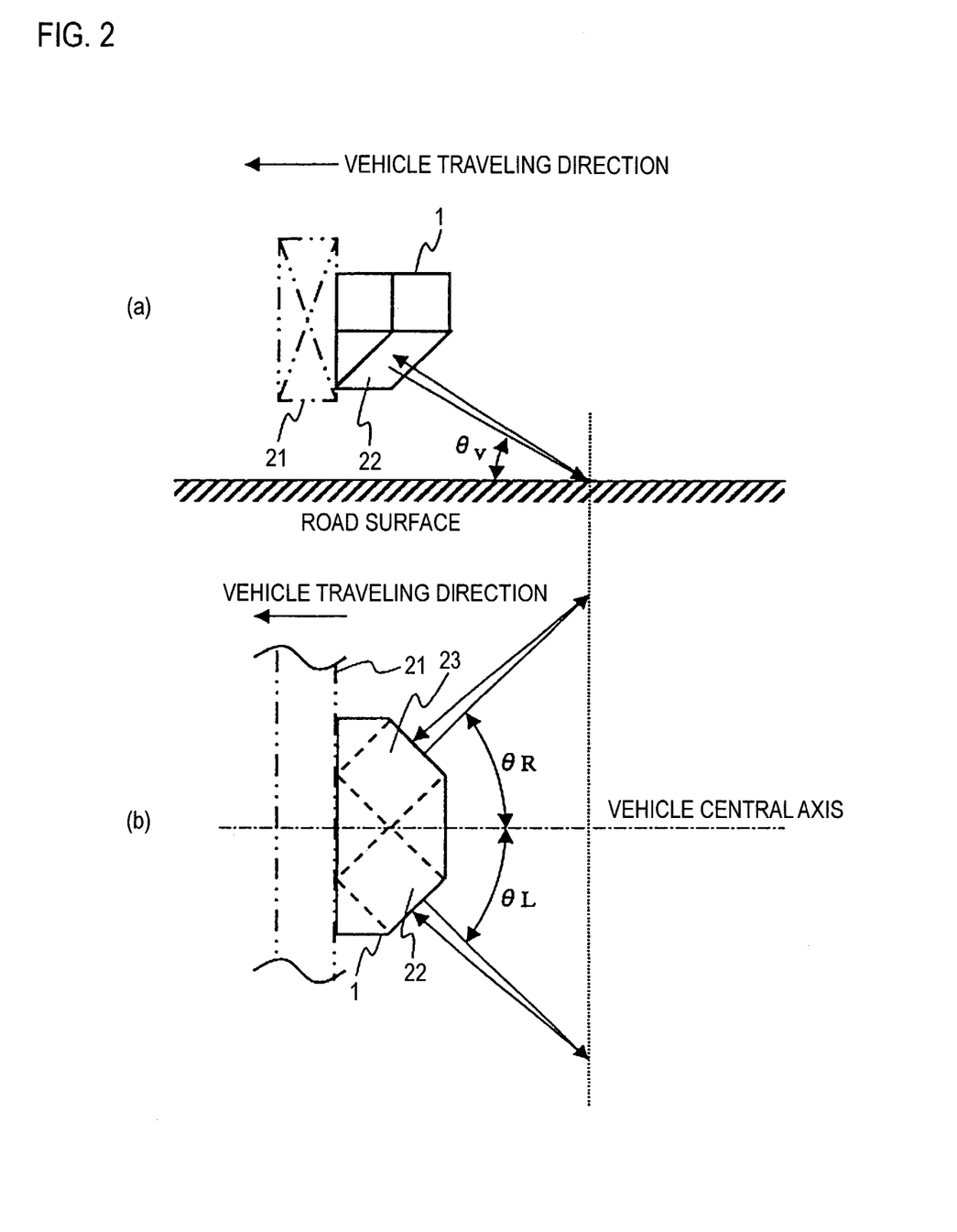
FIG. 2 illustrates an exterior of a radar sensor. (a) side surface, (b) upper surface.

FIG. 2 illustrate an exterior of the ground speed sensor 1. It should be noted that this is nothing more than an example of the embodiment and includes sensors that have the same function(s) even if they have other shapes and layouts. (a) is a view seen from a side surface, and (b) is a view seen from an upper surface. It is attached to a structural member 21 of the vehicle. A left antenna cover surface 22 slants only at $\theta_V$ (e.g., within the range of 30° to 60°) with respect to the road surface. It also slants only at $\theta_L$ (e.g., within the range of 30° to 60°) with respect to a vehicle front-rear central axis of the vehicle. From the left antenna cover surface, it outputs a transmission wave while switching at a time division to a first frequency and a second frequency facing the road surface, and receives a reflection wave from the road surface. Similarly, a right antenna cover surface 23 slants only at $\theta_R$, and it outputs a transmission wave while switching at a time division to a third frequency and a fourth frequency facing the road surface, and receives a reflection wave from the road surface. Here, the changing of the frequency of the transmission wave from a first antenna cover surface and the frequency of the transmission wave from a second antenna cover surface is for preventing interference between adjacently disposed first and second antennas (not illustrated) and for improving measurement precision. Also, it is preferable for the directivity of the first and second antennas to be within ±1°. By making the directivity to be within ±1°, precision within ±2 km/h can be realized.

Figure 3:
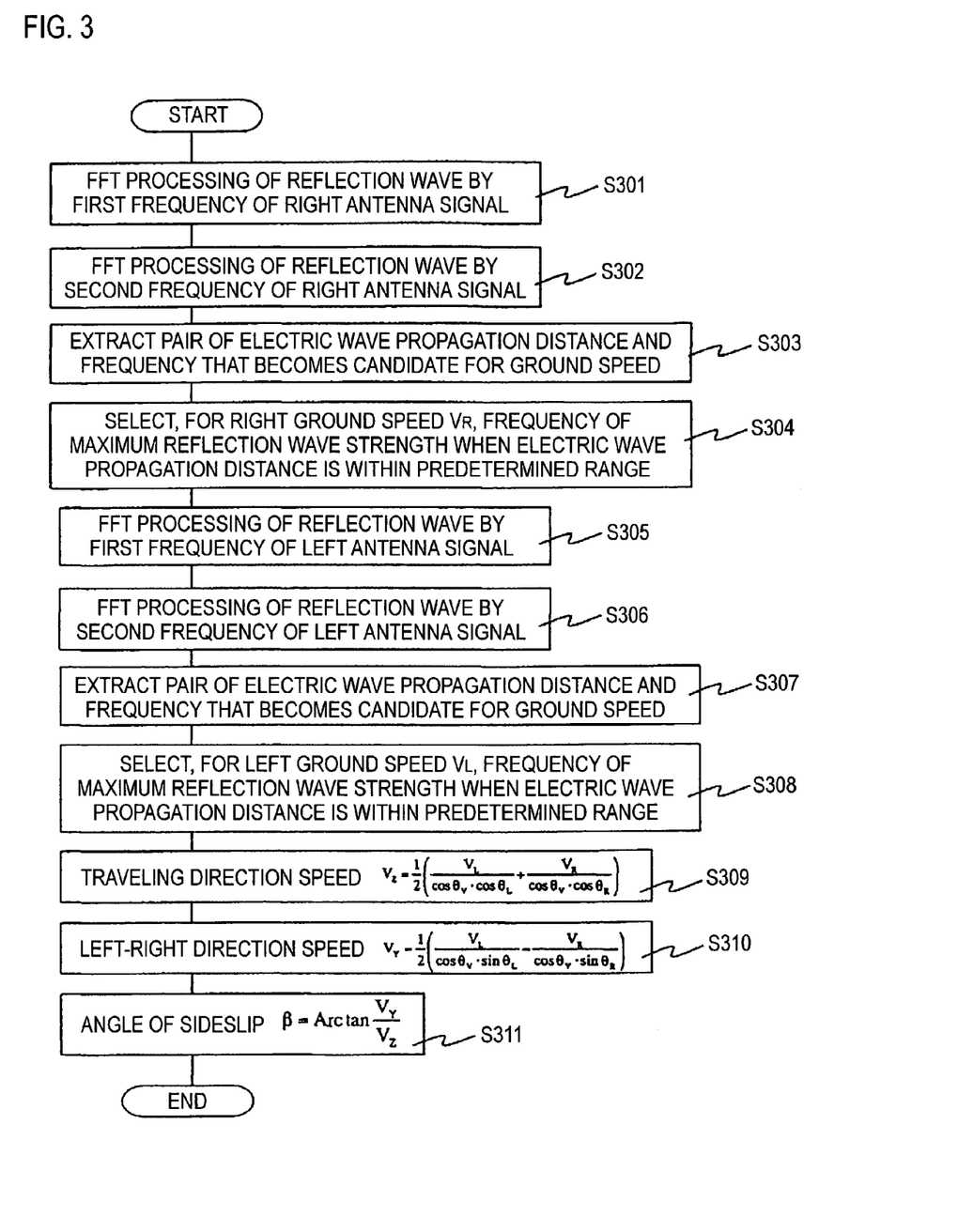
FIG. 3 illustrates a processing flow of the radar sensors.

FIG. 3 illustrates a processing flow that calculates a traveling direction speed vehicle speed $V_Z$ that is a front-rear direction speed of the vehicle in the ground speed sensor, a left-right direction speed $V_Y$, and a measured angle of sideslip $\beta_m$. In step S301, Fourier analysis (FFT processing) is conducted for extracting the Doppler shift superposed on the reflection wave by the first frequency transmission wave (frequency $f_1$) transmitted from the right antenna. In step S302, FFT processing is similarly conducted for extracting the Doppler shift superposed on the reflection wave by the second frequency transmission wave transmitted from the right antenna. In step S303, a first signal strength peak ($S_{R1}$, $f_{d1}$) revealed as the Doppler shift is extracted from the FFT processing result calculated in S301.

$$S_{R1} = A_{R1} + iB_{R1} \qquad \text{(Equations 1)}$$
$$\theta_{R1} = \text{Arc} \tan \frac{A_{R1}}{B_{R1}}$$

Also, a second signal strength peak ($S_{R2}$, $f_{d2}$) revealed as the Doppler shift is extracted from the FFT processing result calculated in S302.

$$S_{R2} = A_{R1} + iB_{R2} \qquad \text{(Equations 2)}$$
$$\theta_{R2} = \text{Arc} \tan \frac{A_{R2}}{B_{R2}}$$

In step S303, an electric wave propagation distance $R_L$ is calculated from the extracted first signal strength peak $S_{R1}$ and the second signal strength peak $S_{R2}$.

$$R_L = \frac{c \cdot |\theta_{R1} - \theta_{R2}|}{4 \cdot \pi \cdot \Delta f} \qquad \text{(Equation 3)}$$

Here, c is light speed, and $\Delta f$ is the difference between the first frequency and the second frequency.

In step S304, a measured ground speed $V_R$ of the right antenna is taken if the electric wave propagation distance $R_L$ is within a predetermined range.

$$V_R = \frac{c \cdot (f_{d1} + f_{d2})}{2 \cdot (f_1 + f_2)} \qquad \text{(Equation 4)}$$

Step S305 to step S308 are similarly a processing flow that measures the ground speed $V_L$ at the left antenna. In step S305, Fourier analysis (FFT processing) is conducted for extracting the Doppler shift superposed on the reflection wave by the third frequency transmission wave (frequency $f_3$) transmitted from the left antenna. In step S306, FFT processing is similarly conducted for extracting the Doppler shift superposed on the reflection wave by the fourth frequency transmission wave transmitted from the left antenna. In step S307, a third signal strength peak ($S_{R3}$, $f_{d3}$) revealed as the Doppler shift is extracted from the FFT processing result calculated in S305.

$$S_{L3} = A_{L3} + iB_{L3} \qquad \text{(Equations 5)}$$
$$\theta_{L3} = \text{Arc} \tan \frac{A_{L3}}{B_{L3}}$$

Similarly, a fourth signal strength peak ($S_{R4}$, $f_{d4}$) revealed as the Doppler shift is extracted from the FFT processing result calculated in S306.

$$S_{L4} = A_{L4} + iB_{L4} \qquad \text{(Equations 6)}$$

-continued $$\theta_{L4} = \text{Arc tan}\frac{A_{L4}}{B_{L4}}$$

In step S307, an electric wave propagation distance $R_L$ is calculated from the extracted third signal strength peak $S_{R3}$ and the fourth signal strength peak $S_{R4}$.

$$R_L = \frac{c \cdot |\theta_{L3} - \theta_{L4}|}{4 \cdot \pi \cdot \Delta f} \quad \text{(Equation 7)}$$

Here, c is light speed, and $\Delta f$ is the difference between the third frequency and the fourth frequency.

In step S308, a measured ground speed $V_L$ of the left antenna is taken if the electric wave propagation distance $R_L$ is within a predetermined range.

$$V_L = \frac{c \cdot (f_{d3} + f_{d4})}{2 \cdot (f_3 + f_4)} \quad \text{(Equation 8)}$$

In step S309, the traveling direction speed $V_Z$ of the vehicle is calculated from the ground speed $V_R$ and the ground speed $V_L$.

$$V_Z = \frac{1}{2}\left(\frac{V_L}{\cos\theta_V \cdot \cos\theta_L} + \frac{V_R}{\cos\theta_V \cdot \cos\theta_R}\right) \quad \text{(Equation 9)}$$

In step S310, the left-right direction speed $V_Y$ of the vehicle is calculated.

$$V_Y = \frac{1}{2}\left(\frac{V_R}{\cos\theta_V \cdot \sin\theta_R} - \frac{V_L}{\cos\theta_V \cdot \sin\theta_L}\right) \quad \text{(Equation 10)}$$

Moreover, in step S311, the measured angle of sideslip $\beta_m$ is calculated.

$$\beta_m = \text{Arctan}\frac{V_Y}{V_Z} \quad \text{(Equation 11)}$$

By this series of processing, the traveling direction speed $V_Z$ of the vehicle, the left-right direction speed $V_Y$ of the vehicle, and the measured angle of sideslip $\beta_m$ can be measured. Moreover, by time-differentiating these measured values, the yaw angle speed, traveling direction acceleration, and left-right direction acceleration can be calculated.

Figure 4:
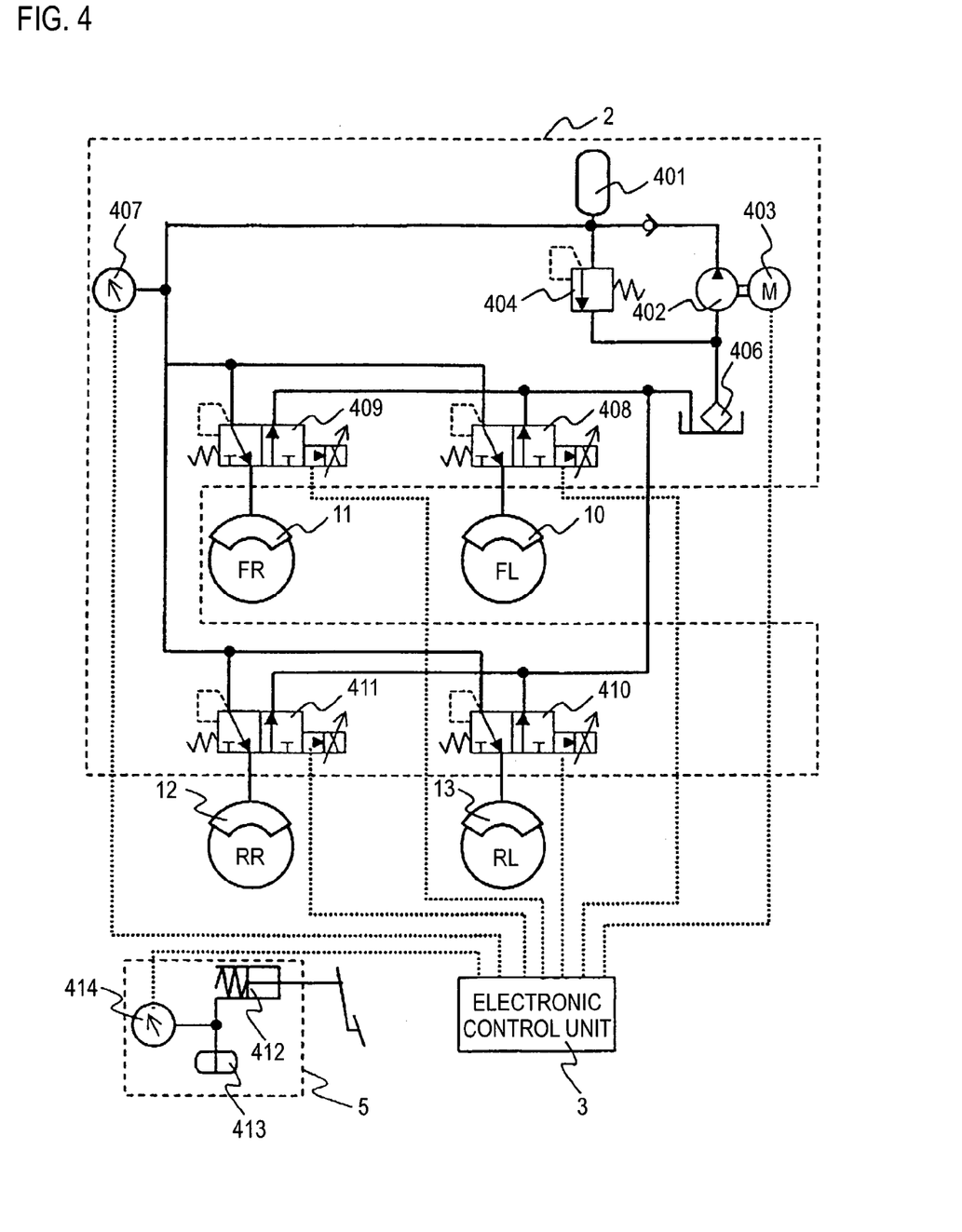
FIG. 4 illustrates a hydraulic circuit of a hydraulic unit.

FIG. 4 illustrates a hydraulic circuit of the hydraulic unit 2. Contained in the hydraulic unit 2 are an accumulator 401, a pump 402, a motor 403, a strainer 406, a spool valve 404, a pressure sensor 407, and four three-way valves 408, 409, 410 and 411. Also, contained in a stroke simulator 5 are a cylinder 412, a tank 413, and a pressure sensor 414. The electronic control unit 3 is connected to the pressure sensor 407, the four three-way valves 408, 409, 410 and 411, the motor 403, and the pressure sensor 414.

Figure 5:
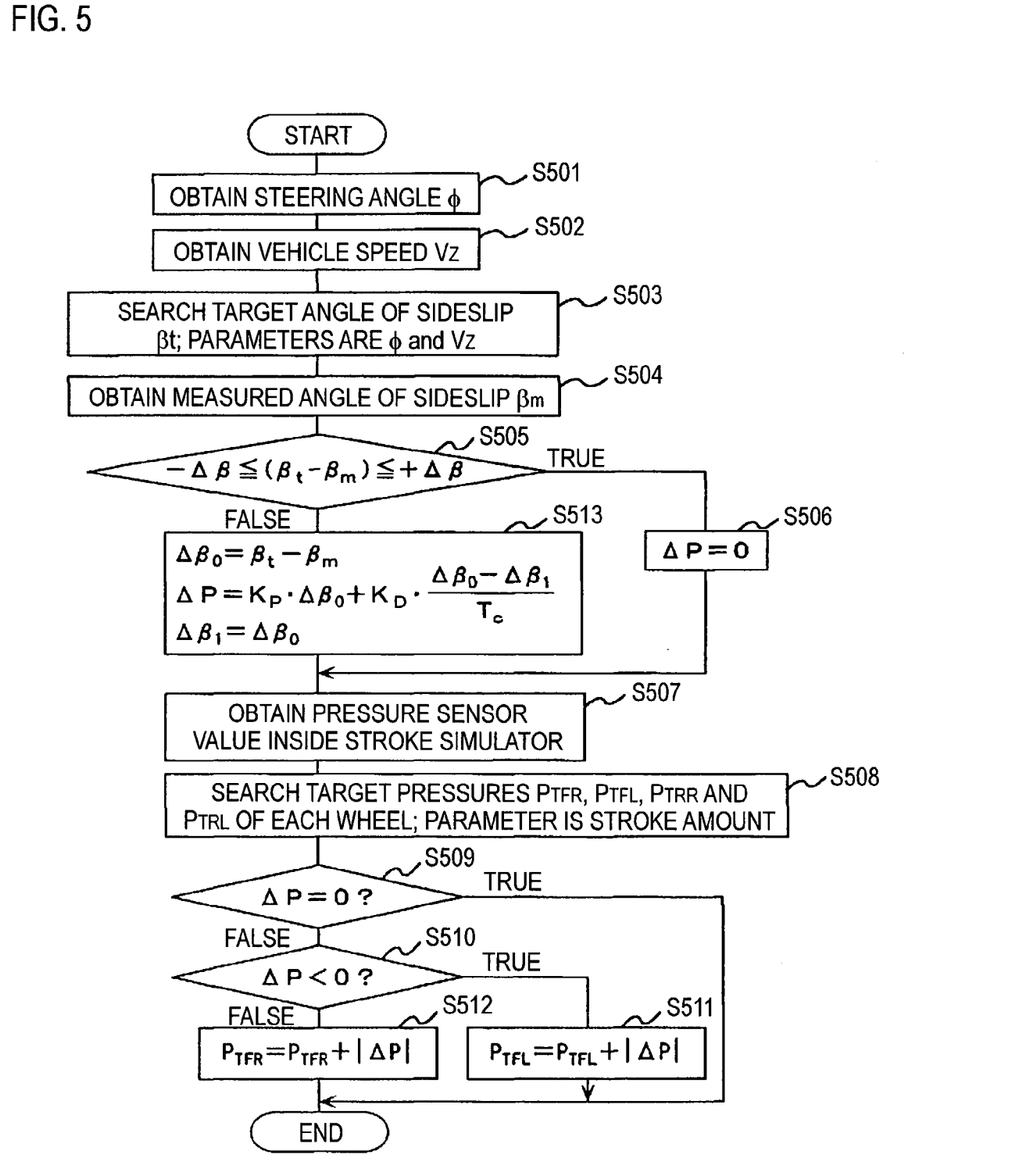
FIG. 5 illustrates a processing flow of an electronic control unit.

FIG. 5 illustrates a processing flow at the electronic control unit 3. In step S501, a steering angle φ is obtained on the basis of an output of the steering angle sensor. In step S502, the traveling direction speed $V_Z$ calculated in the processing of FIG. 3 is obtained. In step S503, a preset target angle of sideslip $\beta_T$ is obtained from the steering angle φ and the traveling direction speed $V_Z$. It is possible to obtain the target angle of sideslip $\beta_T$ by calculating using approximation or searching from, for example, a map or correspondence chart of the target angle of sideslip $\beta_T$ corresponding to the steering angle φ and the traveling direction speed $V_Z$. In step S504, the measured angle of sideslip $\beta_m$ calculated in the processing of FIG. 3 is obtained. In step S505, the amount of deviation between the target angle of sideslip $\beta_T$ and the measured angle of sideslip $\beta_m$ is processed by comparing whether it falls in a preset range of $\pm\Delta\beta$. Because it can be judged to be a neutral steer if it falls in the predetermined range, the determination becomes True in branch processing or comparative processing, the flow proceeds to step S506, and a corrected value $\Delta P$ of brake fluid pressure is set to zero. On the other hand, because it can be judged to be an over-steer or an under-steer if it falls outside of the predetermined range, the determination becomes False in the branch processing or comparative processing, and the flow proceeds to processing of step S506. In step S506, the corrected value $\Delta P$ of brake fluid pressure is calculated from a current deviation amount $\Delta\beta_0$ and a previously calculated deviation amount $\Delta\beta_1$. In step S507, a pressure sensor value $P_{SS}$ within the stroke simulator 5 is obtained. Because the value of the pressure sensor value $P_{SS}$ increases in proportion to the force with which the driver depresses the pedal, it is the same as measuring the brake demand of the driver. In step S508, target brake fluid pressures $P_{TFR}$, $P_{TFL}$, $P_{TRR}$ and $P_{TRL}$ of each wheel are set using the pressure sensor value $P_{SS}$ as a parameter. In step S509, it is determined whether the corrected value $\Delta P$ of brake fluid pressure is zero. If it is zero, the determination becomes True in the branch processing or comparative processing, and the processing is concluded. If it is not zero, the determination becomes False, the processing proceeds to step S510, and in step S510 the positive/negative of the corrected value $\Delta P$ of brake fluid pressure is determined. If it is a positive value, the target brake fluid pressure $P_{TFR}$ of the front wheel right is increased only by the corrected value $\Delta P$ of brake fluid pressure and the processing is terminated. If it is a negative value, the target brake pressure $P_{TFL}$ of the front wheel left is increased only by the corrected value $\Delta P$ of brake fluid pressure and the processing is terminated. Of course, when the corrected value $\Delta P$ of brake fluid pressure is a positive value, effects that are the same as correcting the target brake fluid pressure $P_{TFRO}$ of the front wheel right can be obtained even if the target brake fluid pressure $P_{TRR}$ of the rear wheel right is increased only by the corrected value $\Delta P$ of brake fluid pressure. Moreover, the same effects can be obtained even if the front wheel right target brake fluid pressure $P_{TFR}$ and the target brake fluid pressure $P_{TRR}$ of the rear wheel right are respectively corrected by $\Delta P/2$. In a case where the corrected value $\Delta P$ of brake fluid pressure is a negative value, the same effects can be obtained by similarly correcting the front wheel left and the rear wheel left or only the rear wheel left.

The electronic control unit 3 electronically feedback-controls the four three-way valves 408, 409, 410 and 411 to realize the target brake fluid pressures $P_{TFR}$, $P_{TFL}$, $P_{TRR}$ and $P_{TRL}$ of each wheel. Thus, the amount of deviation between the target angle of sideslip $\beta_T$ and the measured angle of sideslip $\beta_m$ falls in the preset range of $\pm\Delta\beta$. That is, it becomes possible to adjust the brake fluid pressure with the hydraulic unit so that it becomes as much as possible a neutral steer, and safer traveling of the vehicle is realized.

Figure 6:
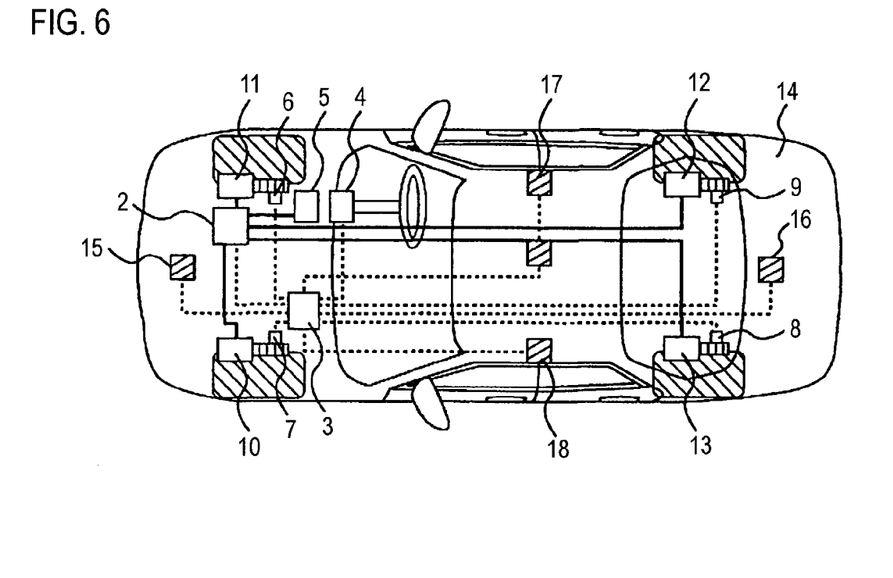
FIG. 6 illustrates a vehicle of a second embodiment equipped with the vehicular travel control device.

FIG. 6 illustrates, as second embodiment, a vehicle equipped the vehicular travel control device of the present invention. Detailed description of elements that are the same as those in the first embodiment will be omitted. In FIG. 6, installed in the vehicle 14 are four radar sensors 15, 16, 17 and 18, the hydraulic unit 2, the electronic control unit 3, the steering angle sensor 4, the stroke sensor 5, the wheel speed sensors 6, 7, 8 and 9, and the brake calipers 10, 11, 12 and 13.

Figure 7:
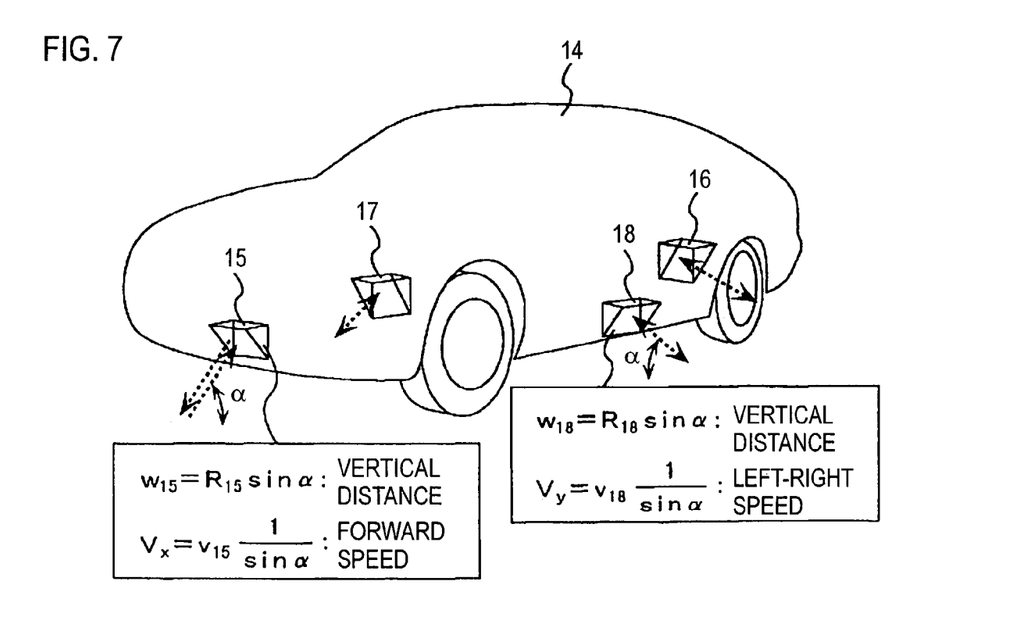
FIG. 7 illustrates a reflection signal and emission direction of a transmission signal of the radar sensor.

FIG. 7 is a view that illustrates the orientation at which the electric waves are emitted toward the road surface. The radar sensor 15 emits, in the traveling direction of the vehicle 14, a signal at an angle of 45 degrees to the road surface. The radar sensor 16 emits, in the reverse direction of the vehicle 14, a signal at an angle of 45 degrees. The radar sensor 17 emits, in the right direction of the vehicle 14, a signal at an angle of 45 degrees. The radar sensor 18 emits, in the left direction of the vehicle 14, a signal at an angle of 45 degrees. Each of the radar sensors measures the distance between the sensor and the road surface and the relative speed between the vehicle and the road surface.

Figure 8:
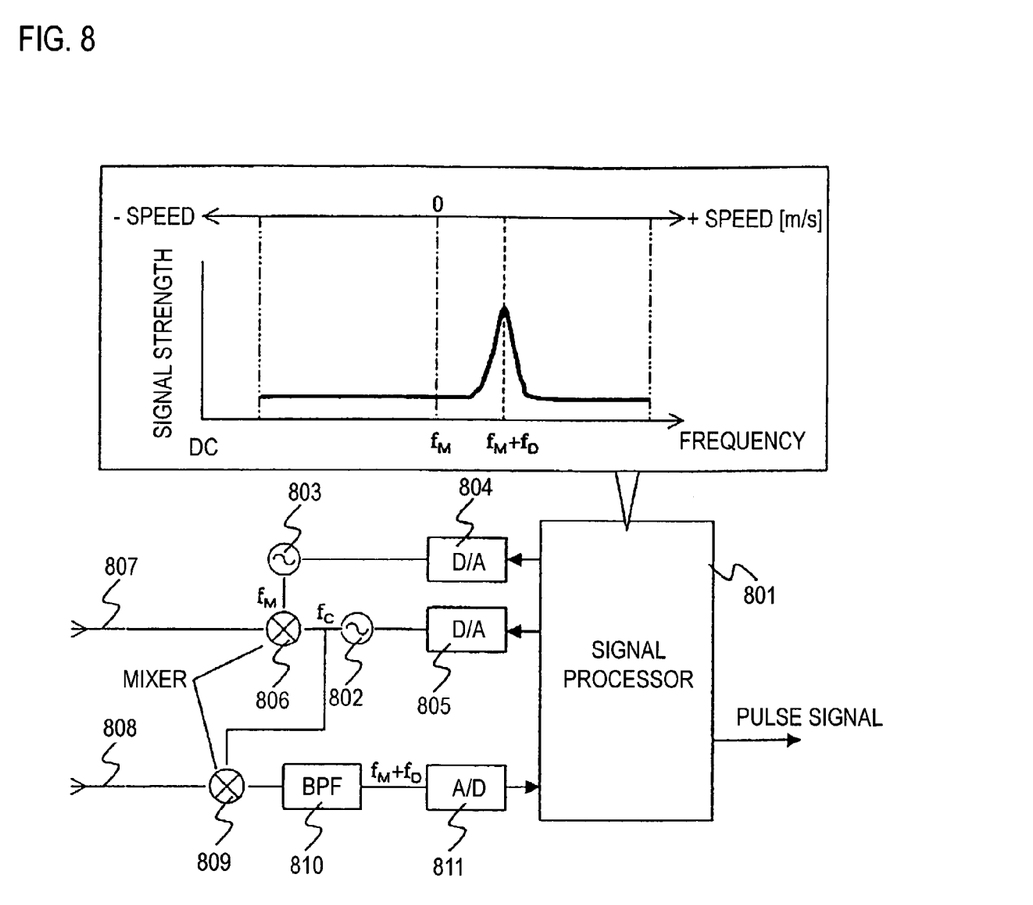
FIG. 8 is a functional block diagram of the radar sensors.

FIG. 8 is a functional block diagram of the radar sensors. The radar sensors comprise a signal processor 801, a voltage control carrier oscillator 802, a voltage control modulation oscillator 803, digital/analog (D/A) converters 804 and 805, a transmission mixer 806, a reception mixer 809, a transmitting antenna 807, a receiving antenna 808, a band-pass filter 810, and an analog/digital (A/D) converter 811. A carrier frequency $f_C$ (e.g., 76.5 GHz and 76.6 GHz) is generated by the voltage control carrier oscillator 802. The carrier frequency $f_C$ can alter the frequency by an output voltage of the D/A converter 805. Also, a modulated frequency $f_M$ that is generated from the voltage control modulation oscillator 803 can also alter the frequency by an output voltage of the D/A converter 804. The generated modulated frequency $f_M$ and the carrier frequency $f_C$ are mixed at the transmission mixer 806 and transmitted to the road surface from the transmitting antenna 807. The reflection wave from the road surface is received by the receiving antenna 808 and downmixed by the reception mixer 809. Moreover, a predetermined band signal is incorporated in the signal processor 801 by the band-pass filter 810 using the A/D converter 811. Fourier conversion is conducted at the signal processor 801. By analyzing the spectral data after Fourier conversion, the ground speed of the vehicle 14 equipped with the radar sensors is understood. In a case where the ground speed is zero, there is a spectral peak in the modulated frequency $f_M$. In a case where there is a ground speed, a spectral peak appears in the frequency $f_M+f_D$. The graph of FIG. 8 illustrates an example of a case where a spectral peak appears in the frequency $f_M+f_D$.

The carrier frequency $f_C$ is switched at a time division into two of a first signal frequency and a second signal frequency by the voltage control carrier oscillator 802. In each frequency, Fourier conversion processing is conducted with respect to the reflection signals, and a phase difference $\Delta\psi$ is detected from the reflection signal strength of the spectral peak of the first signal frequency and the reflection signal strength of the spectral peak of the second signal frequency. The phase difference $\Delta\psi$ is proportional to the distance between the road surface and the radar sensors.

Figure 9:
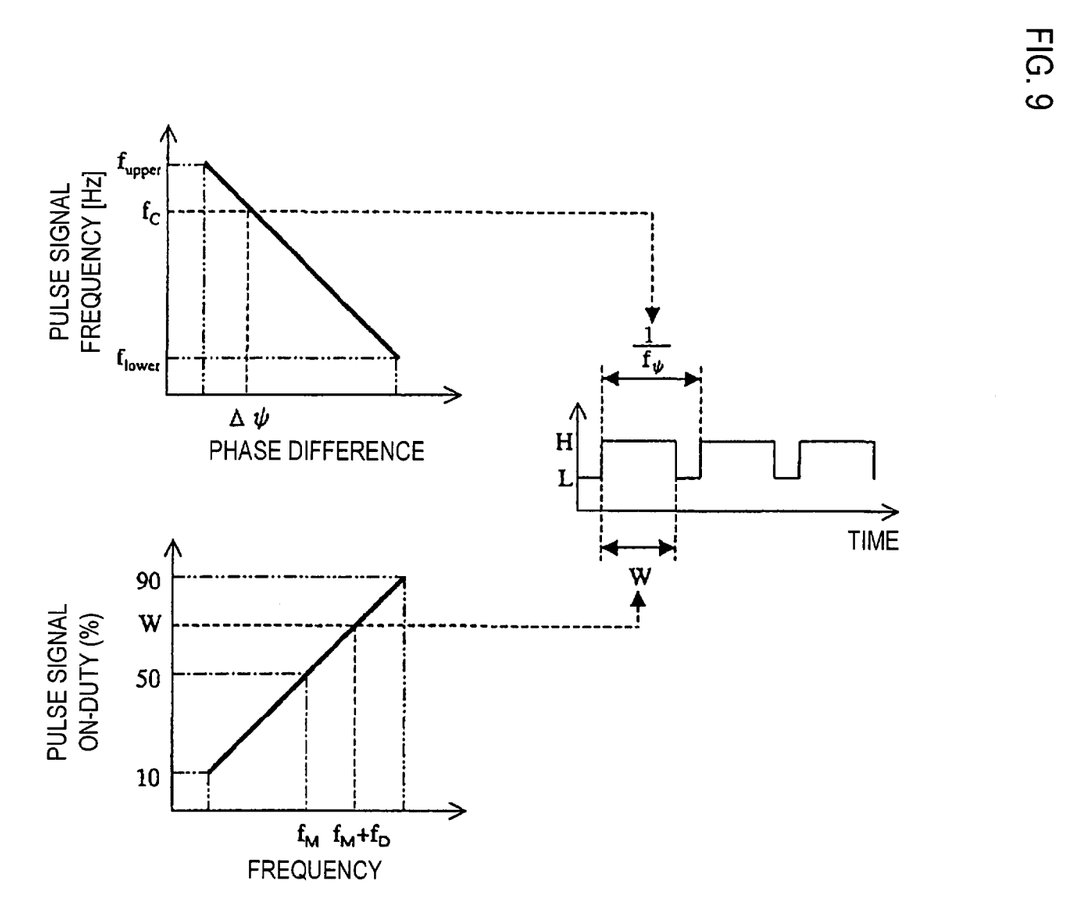
FIG. 9 illustrates the relationship between on-duty and a frequency of an output pulse signal.

FIG. 9 is a diagram illustrating the relationship between the on-duty and period of an output pulse signal from the signal processor 801. First, the frequency (period) is made proportionate to the phase difference $\Delta\psi$ generated by the difference in the two carrier frequencies fc. That is, it is proportionate to the distance between the road surface and the radar sensors, and when the distance is long, the frequency is lowered (the period is lengthened), and when the distance is short, the frequency is raised (the period is shortened). Thus, the measured distance between the road surface and the radar sensors can be converted to the period of the output pulse signal and communicated from the radar sensors to the electronic control unit.

Next, an on-duty ratio $W_{ON}$ is made proportionate to a Doppler shift frequency $f_D$. That is, when the speed is forward, the on-duty ratio is 50% or greater, and the on-duty ratio increases as the speed increases. When the speed is reverse, the on-duty ratio is less than 50%, and the on-duty ratio becomes smaller as the speed increases. Thus, the relative speed (ground speed) between the road surface and the radar sensors can be converted to the on-duty of the output pulse signal and communicated from the radar sensors to the electronic control unit. Information of the relative speed and distance can be superposed on the output pulse signals from the radar sensors by this method and transmitted to the electronic control sensor. Of course, it may also be transmitted by a traditional serial signal.

Figure 10:
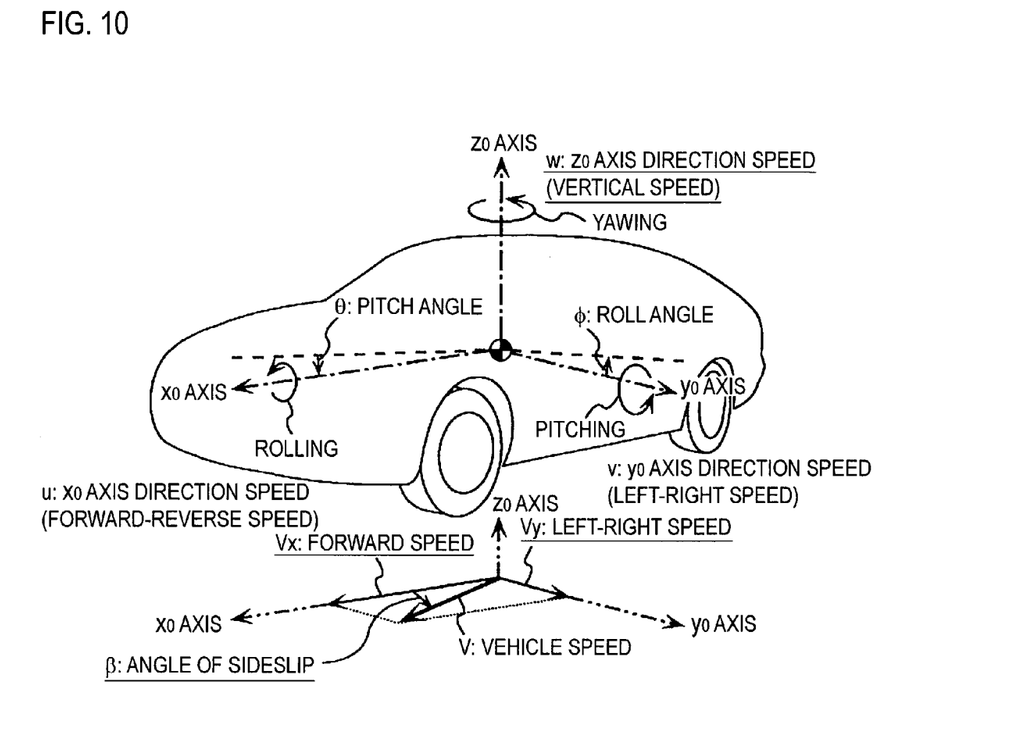
FIG. 10 illustrates physical quantities of vehicular movement processed by the electronic control unit.

FIG. 10 illustrates the physical quantities calculated inside the electronic control unit from the four radar sensors. Inside the electronic control unit, the forward speed $V_X$, the left-right direction speed $V_Y$, the vertical speed w, the angle of sideslip $\beta$, the pitch angle $\theta$, and the roll angle $\phi$ are calculated. First, the forward speed $V_X$ is calculated by equation 12.

$$V_X = \frac{\frac{v_{15}}{\sin(\alpha+\theta)} - \frac{v_{16}}{\sin(\alpha-\theta)}}{2} \quad \text{(Equation 12)}$$

Here, $V_{15}$ is relative speed information of the radar sensor 15, $V_{16}$ is relative speed information of the radar sensor 16, and $\alpha$ is the mounting angle between the radar sensors and the road surface (e.g., 45 degrees). Next, the left-right direction speed $V_Y$ is calculated by equation 13.

$$V_Y = \frac{\frac{v_{17}}{\sin(\alpha+\phi)} - \frac{v_{18}}{\sin(\alpha-\phi)}}{2} \quad \text{(Equation 13)}$$

Here, $V_{17}$ is relative speed information of the radar sensor 17, and $V_{18}$ is relative speed information of the radar sensor 18. Next, the angle of sideslip $\beta$ is calculated by equation 14.

$$\beta = \text{Arc } \tan\left(\frac{V_Y}{V_X}\right) \quad \text{(Equation 14)}$$

Next, the vertical distance between each radar sensor and the road surface is calculated by equations 15.

$$\begin{cases} w_{15} = T_{15}\sin(\alpha+\theta) \\ w_{16} = T_{16}\sin(\alpha-\theta) \\ w_{17} = T_{17}\sin(\alpha+\phi) \\ w_{18} = T_{18}\sin(\alpha-\phi) \end{cases} \quad \text{(Equations 15)}$$

Here, $R_{15}$ to $R_{18}$ are distance information of the radar sensor 15 to the radar sensor 18. Next, the pitch angle $\theta$ is calculated by equation 16.

$$\theta = \text{Arc tan}\left(\frac{w_{15} - w_{16}}{2 \cdot L_{VEHICLE}}\right) \quad \text{(Equation 16)}$$

Here, $L_{VEHICLE}$ is the length of the vehicle. Lastly, the roll angle $\phi$ is calculated by equation 17.

$$\phi = \text{Arc tan}\left(\frac{w_{17} - w_{18}}{2 \cdot W_{VEHICLE}}\right) \quad \text{(Equation 17)}$$

By repeatedly calculating the calculations of equation 12 to equation 17 per predetermined period, it becomes possible to calculate the forward speed $V_X$, the left-right direction speed $V_Y$, the vertical speed w, the angle of sideslip $\beta$, the pitch angle $\theta$, and the roll angle $\phi$. At this time, the initial values of the pitch angle $\theta$ and the roll angle $\phi$ are respectively set to zero, and calculation becomes simple when the pitch angle $\theta$ and the roll angle $\phi$ of the previous period are used per period.

Figure 11:
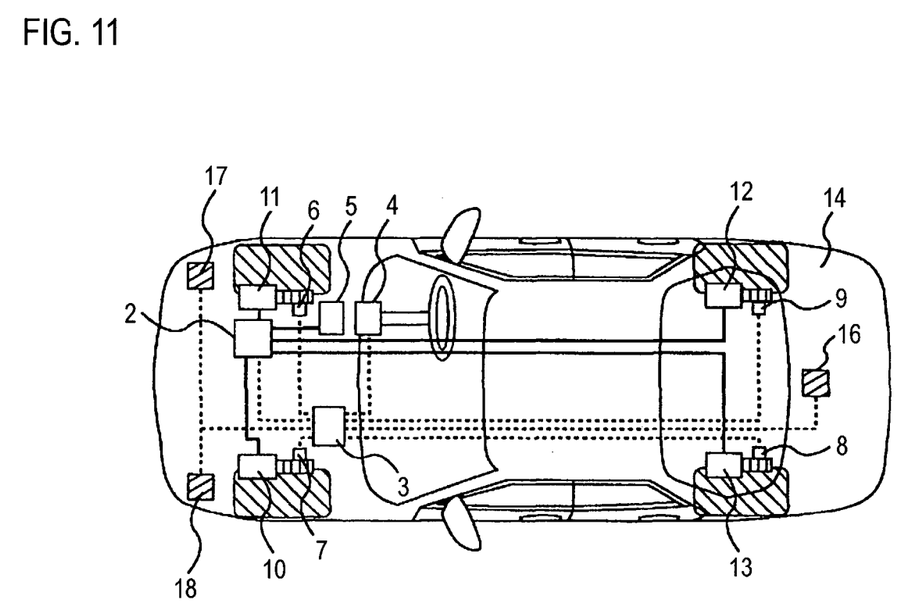
FIG. 11 illustrates a vehicle of a third embodiment equipped with the vehicular travel control device.

FIG. 11 illustrates, as a third embodiment, a vehicle equipped with the travel control device of the present invention. Installed in the vehicle 14 are three radar sensors 16, 17 and 18, the hydraulic unit 2, the electronic control unit 3, the steering angle sensor 4, the stroke sensor 5, the wheel speed sensors 6, 7, 8 and 9, and the brake calipers 10, 11, 12 and 13. The forward speed $V_X$, the left-right direction speed $V_Y$, the vertical speed w, the angle of sideslip $\beta$, the pitch angle $\theta$, and the roll angle $\phi$ can be calculated even by using the three radar sensors 16, 17 and 18. First, the forward speed $V_X$ is calculated by equation 12.

$$V_X = -\frac{v_{16}}{\sin(\alpha - \theta)} \quad \text{(Equation 18)}$$

Here, $V_{16}$ is relative speed information of the radar sensor 16, and $\alpha$ is the mounting angle between the radar sensors and the road surface (e.g., 45 degrees). Next, the left-right direction speed $V_Y$ is calculated by equation 19.

$$V_Y = \frac{\frac{v_{17}}{\sin(\alpha + \phi)} - \frac{v_{18}}{\sin(\alpha - \phi)}}{2} \quad \text{(Equation 19)}$$

Here, $V_{17}$ is relative speed information of the radar sensor 17, and $V_{18}$ is relative speed information of the radar sensor 18. Next, the angle of sideslip $\beta$ is calculated by equation 20.

$$\beta = \text{Arc tan}\left(\frac{V_Y}{V_X}\right) \quad \text{(Equation 20)}$$

Next, the vertical distance between each radar sensor and the road surface is calculated by equations 15.

$$\begin{cases} w_{16} = T_{16}\sin(\alpha - \theta) \\ w_{17} = T_{17}\sin(\alpha + \phi) \\ w_{18} = T_{18}\sin(\alpha - \phi) \end{cases} \quad \text{(Equations 21)}$$

Here, $R_{16}$ to $R_{18}$ are distance information of the radar sensor 15 to the radar sensor 18. Next, the pitch angle $\theta$ is calculated by equation 16.

$$\theta = -\text{Arc tan}\left(\frac{2 \cdot w_{16}}{L_{VEHICLE}}\right) \quad \text{(Equation 22)}$$

Here, $L_{VEHICLE}$ is the length of the vehicle. Lastly, the roll angle $\phi$ is calculated by equation 17.

$$\phi = \text{Arc tan}\left(\frac{w_{17} - w_{18}}{2 \cdot W_{VEHICLE}}\right) \quad \text{(Equation 23)}$$

By repeatedly calculating the calculations of equation 18 to equation 23 per predetermined period, it becomes possible to calculate the forward speed $V_X$, the left-right direction speed $V_Y$, the vertical speed w, the angle of sideslip $\beta$, the pitch angle $\theta$, and the roll angle $\phi$. At this time, the initial values of the pitch angle $\theta$ and the roll angle $\phi$ are respectively set to zero, and calculation becomes simple when the pitch angle $\theta$ and the roll angle $\phi$ of the previous period are used per period.

According to embodiments 1 to 3, six physical quantities—the forward speed, the left-right direction speed, the vertical speed, the angle of sideslip, the pitch angle, and the roll angle—can be calculated by using three or four radar sensors. Also, three physical quantities—the forward speed, the left-right speed, and the angle of sideslip—can be calculated by using two radar sensors.

According to the invention, it becomes possible to obtain six physical quantities—the forward speed, the left-right direction speed, the vertical speed, the angle of sideslip, the pitch angle, and the roll angle—necessary for the momentum of a vehicle with a few number of radar sensors.

Also, because the information of relative speed and distance is superposed on the on-duty and period of the pulse signal, communication between the radar sensors and the electronic control unit in which the adverse effect of noise is reduced becomes possible.

Moreover, a vehicle in which braking distance at the time of braking is more shortened and vehicle behavior is more stable can be provided.

What is claimed is:

1. A vehicular travel control device comprising radar sensors that emit an emission signal onto a road surface and receive a reflection signal resulting from the emission signal being reflected from the road surface; a steering angle sensor that detects a steering angle; a brake unit that controls a braking force of wheels; and a control unit that inputs a signal from the radar sensors or the steering angle sensor, processes the inputted signal, and outputs the processed signal to the brake unit; wherein a Doppler shift frequency superposed on the reflection signal is detected and the braking force of the wheels is controlled on the basis of the detected Doppler frequency, a measured angle of sideslip and a ground speed are calculated on the basis of the Doppler shift frequency, and the braking force of the wheels is controlled so that the measured angle of sideslip follows a target angle of sideslip set from the ground speed and the steering angle detected by the steering angle sensor wheel speed sensors disposed in correspondence to the wheels, wherein the braking force of the wheels is controlled so that a measured wheel speed value detected by the wheel speed sensors follows a target wheel speed set on the basis of the Doppler shift frequency shock absorbers that vary a damping coefficient corresponding to the wheels, wherein the damping coefficient of the shock absorbers or the braking force of the wheels is controlled on the basis of the phase difference between the emission signal and the reflection signal and the Doppler shift frequency superposed on the reflection signal.

2. A vehicular travel control device comprising:

plural radar sensors with which a vehicle is equipped to emit respective electric wave signals onto a road surface and receive reflection signals resulting from the electric wave signals being reflected from the road surface;

a steering angle sensor that detects a steering angle;

a brake unit that controls braking forces of wheels; and a control unit that inputs signals from the radar sensors and the steering angle sensor, processes the inputted signals, and outputs the processed signals to the brake unit;

wherein the radar sensors respectively detect ground speeds of their own from Doppler shift frequencies superimposed on the reflection signals from the road surface, the control unit calculates a ground speed of the vehicle and a measured angle of sideslip, on the basis of ground speeds of the radar sensors, and the control unit controls the braking forces of the wheels so that the measured angle of sideslip follows a target angle of sideslip set on the basis of the ground speed of the vehicle and the steering angle detected by the steering angle sensors.

3. The vehicular travel control device of claim 2, further including wheel speed sensors disposed in correspondence to the wheels, wherein the braking forces of the wheels are controlled so that measured wheel speed values detected by the wheel speed sensors follow respective target wheel speeds set on the basis of the Doppler shift frequencies.

4. The vehicular travel control device of claim 2, wherein the radar sensors and the control unit are connected by at least two electrical wires and communicate with a pulse width modulation signal between the radar sensors and the control unit.

5. A vehicle that includes the vehicular travel control device of claim 2.

6. The vehicular travel control device of claim 2, comprising at least three radar sensors, wherein the three sensors are mounted so as to emit respective electric wave signals in different directions to each other.

7. The vehicular travel control device of claim 2, comprising at least three radar sensors, wherein the three sensors are mounted so as to emit respective electric wave signals in difficult direction each other, and the control unit further calculates at least one of, a pitch angle, and a roll angle of the vehicle, on the basis of the detected ground speeds of radar sensors.

8. The vehicular travel control device of claim 7, wherein the at least three radar sensors comprise four radar sensors, wherein the first radar sensor emits an electric wave signal to the road in the traveling direction of the vehicle, the second radar sensor emits an electric wave signal to the road in the reverse direction of the vehicle, the third radar sensor emits an electric wave to the road in the left direction of the vehicle, and the fourth radar sensor emits an electric wave to the road in the right direction of the vehicle.

9. The vehicular travel control device of claim 7, wherein the first radar sensor is mounted in front of a left front wheel of the vehicle, the second radar sensor is mounted in front of a right front wheel of the vehicle, and the third radar sensor is mounted at the behind of the vehicle.

10. The vehicular travel control device of claim 8, wherein the first radar sensor is mounted in front of a cabin of the vehicle, the second radar sensor is mounted at the behind of the cabin, the third radar sensor is mounted at left side of the cabin, and the fourth radar sensor is mounted at right side of the cabin.

11. A vehicular travel control device including at least:

plural radar sensors with which a vehicle is equipped to emit respective electric wave signals onto a road surface and receive reflection signals resulting from the electric wave signals being reflected from the road surface;

a steering angle sensor that detects a steering angle;

a brake unit that controls braking forces of wheels; and a control unit that inputs signals from the radar sensors and the steering angle sensor, processes the inputted signals, and outputs the processed signals to the brake unit;

wherein Doppler shift frequencies superposed on the reflection signals are detected and the braking forces of the wheels are controlled on the basis of the detected Doppler frequencies, a measured angle of sideslip and a ground speed of the vehicle are calculated on the basis of the Doppler shift frequencies, and the braking forces of each wheels are controlled so that the measured angle of sideslip follows the target angle of sideslip set from the ground speed and the steering angle detected by the steering angle sensor, further including wheel speed sensors disposed in correspondence to the wheels, wherein the braking forces of the wheels are controlled so that measured wheel speed values detected by the wheel speed sensors follows respective target wheel speeds set of the basis of the Doppler shift frequencies, and shock absorbers that vary damping coefficients corresponding to the wheels, wherein each of damping coefficients of the shock absorbers or each of the braking forces of the wheels is controlled on the basis of the phase difference between each emitted electric wave signal and its reflection signal and the Doppler shift frequency superposed on the reflection signal.

12. A radar sensor comprising:

a transmitter device that emits electric wave signals onto a road surface;

a receiver device that receives a reflection signal resulting from the electric wave signal being reflected from the road surface; and a communications device that communicates an output pulse signal to an electronic control as a function of the reflected signal;

wherein a frequency of the output pulse signal from the communication device is varied on the basis of a phase difference between plural reflection signals of different frequencie, and an on-duty ratio is varied on the basis of a Doppler shift frequency superposed of the reflected signal.

* * * * *